United States Patent [19]
Burgman et al.

[11] Patent Number: 5,545,102
[45] Date of Patent: Aug. 13, 1996

[54] DIFFERENTIAL GEAR ASSEMBLY

[75] Inventors: Boris I. Burgman, Oak Park; Robert J. Gonzales, Canton, both of Mich.

[73] Assignee: General Motors Corporation, Detroit, Mich.

[21] Appl. No.: 277,853

[22] Filed: Jul. 20, 1994

[51] Int. Cl.$^6$ ............................ F16H 48/06; F16H 57/08
[52] U.S. Cl. .............................. 475/230; 475/346
[58] Field of Search ........................ 475/221, 230, 475/234, 331, 346; 74/606 R

[56] References Cited

U.S. PATENT DOCUMENTS

| | | | |
|---|---|---|---|
| 2,561,335 | 7/1951 | Buckendale | 475/230 X |
| 2,817,251 | 12/1957 | Stamm | 74/711 |
| 3,848,482 | 11/1974 | Shank | 475/230 X |
| 3,872,741 | 3/1975 | Berchtold et al. | 475/230 X |
| 3,915,267 | 10/1975 | Shea | 192/5 |
| 4,305,313 | 12/1981 | Konkle | 465/230 X |
| 4,455,889 | 6/1984 | Hauser | 475/346 X |
| 4,543,854 | 10/1985 | Roth | 74/713 |
| 4,722,244 | 2/1988 | Tsuchiya et al. | 74/713 |
| 4,959,043 | 9/1990 | Klotz et al. | 475/230 |
| 5,098,355 | 3/1992 | Long | 465/346 X |

FOREIGN PATENT DOCUMENTS

| | | | |
|---|---|---|---|
| 2653978 | 6/1978 | Germany | 475/230 |
| 149652 | 7/1986 | Japan | 475/230 |

*Primary Examiner*—Khoi Q. Ta
*Attorney, Agent, or Firm*—Donald F. Scherer

[57] ABSTRACT

A differential gear assembly has a planetary reduction gearing and a bevel differential mechanism which share a common carrier. The bevel gear differential mechanism has four pinion gears mounted in the carrier in pairs on slidably disposed supports. The supports also secure telescoping parts of the carrier together to permit easy assembly. The four pinions mesh with two side gears which are rotatably supported in the carrier and connected with respective output shafts.

2 Claims, 2 Drawing Sheets

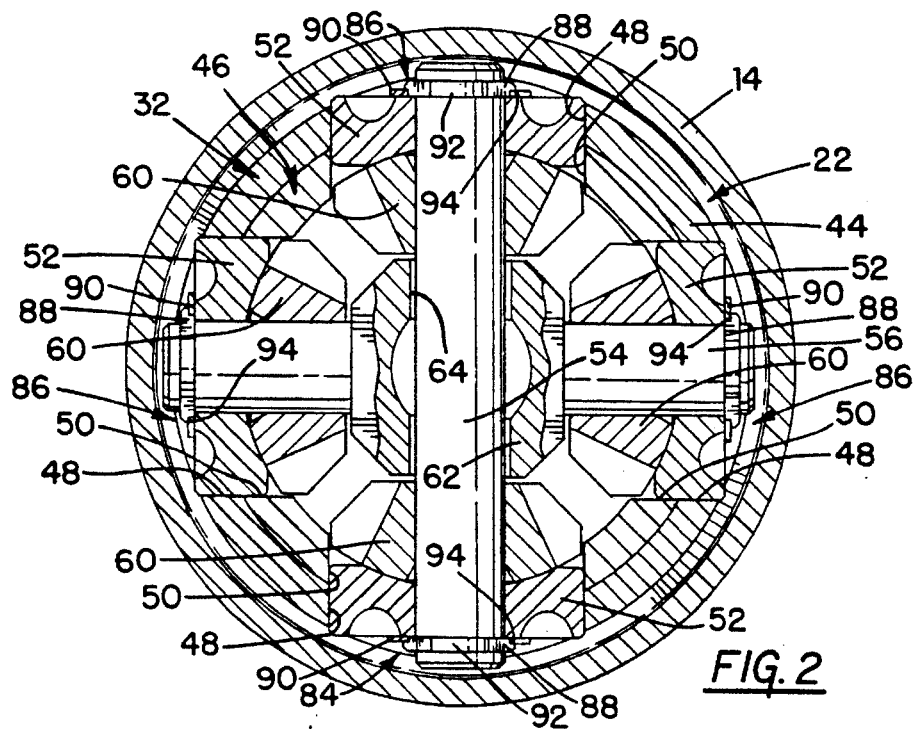

DIFFERENTIAL GEAR ASSEMBLY

TECHNICAL FIELD

This invention relates to differential assemblies, and more particularly, to such bevel gear differential assemblies having four pinion gears mounted in pairs in a load sharing arrangement in the carrier.

BACKGROUND OF THE INVENTION

Automotive power trains generally include a differential assembly which permits the driving wheels of the vehicle to rotate at different speeds when required for cornering or traction differences.

In front wheel drive mechanisms, the differential assembly is generally incorporated into the transmission gearing with a planetary gear reduction. The planetary gear reduction has a torque transmitting assembly, usually a carrier, between the transmission output shaft and the differential input member. The carrier rotatably supports the pinion gears of the differential which mesh with side gears which are drivingly connected with the drive axis of the vehicle.

SUMMARY OF THE INVENTION

The present invention provides a four pinion differential, wherein the pinions are disposed in free floating pairs, such that the differential housing or carrier does not absorb the radial separating loads of the pinions. This permits a smaller housing structure. The housing structure is of a telescoping design, wherein the telescoping components are held in a nontelescoping position after assembly by pinion support members. The pinion support members transmit torque forces between the pinion shafts and the carrier. These forces are distributed over a large area which also is of benefit in reducing the overall size of the assembly.

The telescoping components aid in providing a simple assembly process permitting the side gears or output gears to be assembled in or positioned in one housing member prior to the telescoping portion being installed. The free floating arrangement of the pinions allows for assembly of these components after the telescoping portion is installed.

Thrust loads on the pinion assemblies are not transmitted directly to the housing, but are contained in the pinion shafts. This permits the use of a smaller lighter weight housing.

It is therefore an object of this invention to provide an improved differential assembly having four pinions disposed in two free floating pairs.

It is another object of this invention to provide an improved differential assembly having a housing assembly with telescoping members that are unencumbered by radial support loads from four pinion gears rotatably mounted therein.

It is a further object of this invention to provide an improved differential assembly having a small telescoping housing, wherein the telescoping components are maintained in a relatively fixed position after assembly by pinion support members, and wherein the pinion support members are disposed to absorb or contain the reaction forces on the pinions as a result of driving forces introduced into the differential assembly.

These an other objects and advantages of the present invention will be more apparent from the following description and drawings.

DESCRIPTION OF THE DRAWINGS

FIG. 2 is view taken along line 2—2 of FIG. 1.

FIG. 3 is a an exploded isometric view of the components contained within the differential mechanism.

DESCRIPTION OF AN EXEMPLARY EMBODIMENT

Figure 1:
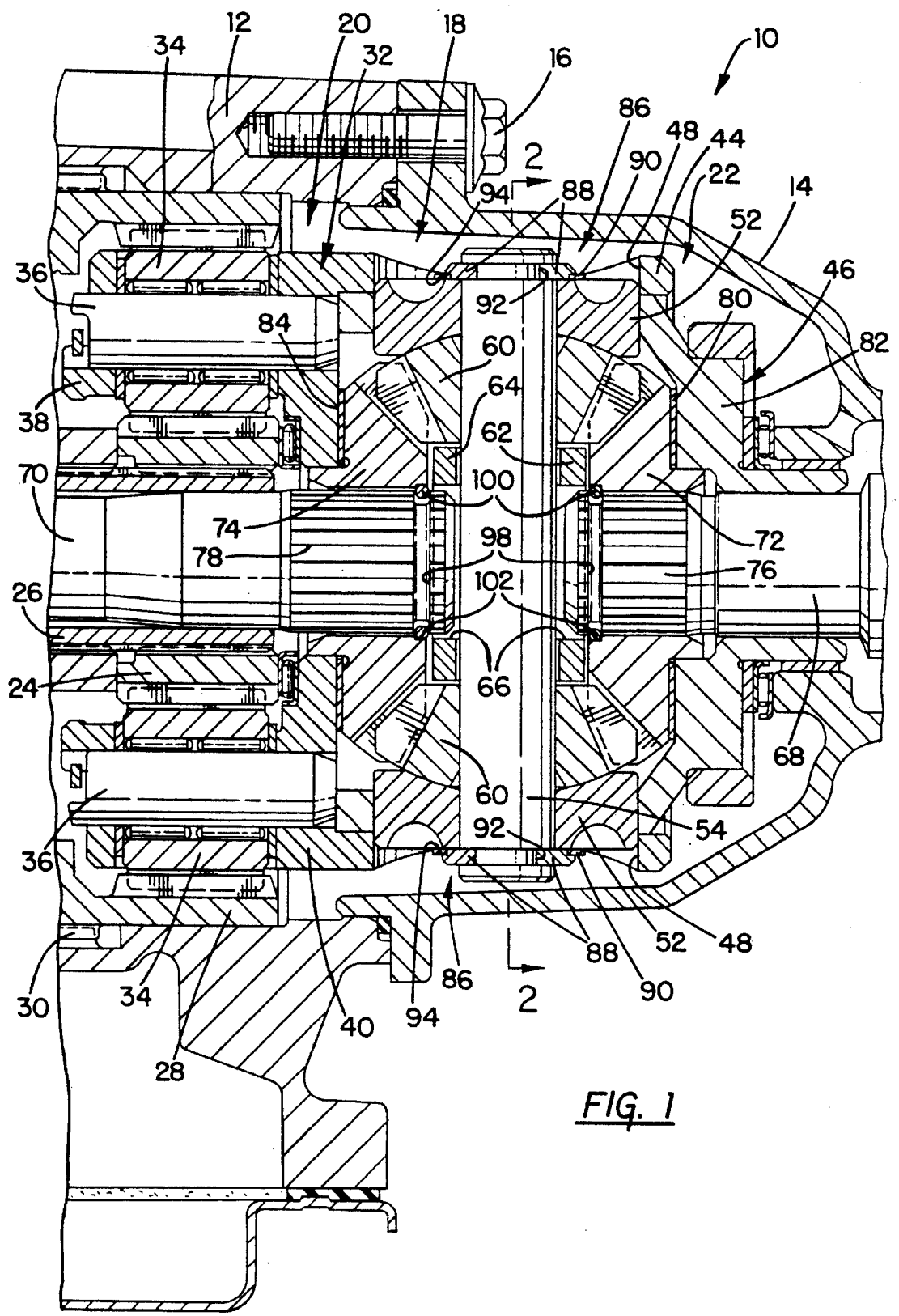
FIG. 1 is a cross-sectional elevational view of a portion of a power transmission showing a differential gear assembly.

Referring to the drawings, wherein like characters represent the same or corresponding parts throughout the several views, there is seen, particularly in FIG. 1, a portion of a transmission assembly 10, which includes a transmission housing 12 to which is secured an end cover 14. A plurality of threaded fasteners 16 are installed to hold the end cover 14 to the transmission housing 10.

Disposed within the transmission housing 12 and end cover 14 is a differential assembly 18 comprised of a planetary gear reduction assembly 20 and a bevel gear differential assembly 22. The planetary reduction assembly 20 includes a sun gear 24, which is drivingly connected with a transmission output shaft 26, a ring gear 28, which is secured by a spline connection 30 to the transmission housing 12, and a planet carrier 32 in which is rotatably supported a plurality of pinion gears 34. The pinion gears 34 are rotatably supported on pinion pins 36, which are disposed in side plates or wall members 38 and 40 of the carrier 32.

The planetary gear reduction assembly 20, as is well known, will provide a speed reduction from the transmission output shaft 26 to carrier 32. The carrier 32 includes the two wall members 40 and 38, and a tubular extending portion 44. The portion 44 has slidably disposed therein a telescoping housing 46.

As best seen in FIG. 3, the portion 44 has a plurality of circumferentially spaced openings 48, and the telescoping housing 46 has a plurality of circumferentially spaced openings 50. When the telescoping housing 46 is disposed within the portion 44 of carrier 32, the respective openings 48 and 50 will be aligned.

As seen in FIGS. 1 and 2, the openings 48 and 50 are sized to receive pinion supports 52. Each pair of openings 48 and 50 has a pinion support 52. Disposed between pairs of pinion supports 52 is either a shaft 54 or a shaft and cross piece 56. For simplicity, both of these members will be referred to as shafts.

The shaft 54 has rotatably supported thereon a pair of pinion gears 60, and the shaft 56 has rotatably supported thereon a pair of pinion gears 60. The shaft and cross piece 56 has a center support portion 62 which has a bore 64 through which the shaft 54 passes. The center support 62 has aligned side openings 66 in which the ends of a pair of differential output shafts 68 and 70 are located.

The shaft 68 has drivingly connected thereto a side gear 72 and the shaft 70 has drivingly connected thereto a side gear 74. The side gears 72 and 74 are drivingly connected through respective spline structures 76 and 78. A thrust washer 80 is disposed between the side gear 72 and an end wall 82 of the telescoping housing 46. A thrust washer 84 is disposed between the side gear 74 and the wall 40 of the carrier 32. These thrust washers 80 and 84 are effective to transmit forces imposed on the side gears 72 and 74 to the respective supporting wall members 82 and 40, which in turn will attempt to telescope the carrier 32 and housing 46.

This telescoping action is absorbed within the pinion supports 52. This distributes the thrust forces on the side gears through a large area on the carrier assembly.

The shafts 54 and 56 each have a locking or keeper assembly 86 comprised of a pair of half rings or keepers 88 and a locking ring 90. The half rings 88 are disposed in a groove 92 formed in each of the shafts 54 and 56, and are prevented from separating from the respective shafts by the lock rings 90. The lock rings 90 are assembled in semi-annular grooves 94 formed in the keepers 88.

The pinion gears 60, as is well known, are subjected to outward or radial forces as a result of the annular contact between the respective pinion gears and the side gears. The radially outward forces are contained within the shaft and pinion gear assemblies by the lock assemblies 86. Thus, the radial forces of the pinion gears do not need to be absorbed by the housing permitting the housing to be made with less mass.

The pinion supports 52 maintain the pinion gear and shaft assemblies in a substantially floating configuration within the bevel gear assembly 22. The pinion gears 60 and their respective shafts 54 and 56, can move radially relative to the central axis or longitudinal axis with the differential assembly 18 thereby balancing the forces on the pinion gears.

As best seen in FIG. 2, the pinion gears 60 assembled with shaft 56 have the center support 62 which permits radial clearance between the shaft 56 and the shaft 54. Thus, the pinion gear assemblies comprised of pinion gears 60, shaft 56 and lock assembly 86, are also free to float radially thereby balancing the thrust forces which are imposed upon the pinion gears 60 during the transmission of torque from the carrier 32 to the output shafts 68 and 70. This free floating assembly provided by the pinion supports 52, shafts 54 and 56, pinion gears 60 and the locking assemblies 86, remove a great deal of the loading from the differential housing assembly comprised of the carrier 32 and the telescoping housing 46. This permits the housing assembly to be made of lighter weight materials, thereby removing an amount of inertia from the transmission system which will improve the overall efficiency.

The telescoping assembly and lock assemblies 86 permit the easy disassembly and assembly of the unit, such that any needed repairs can be occasioned with minimum time required.

The use of the pinion supports 52 to maintain the telescoping assembly in a fixed location within the transmission proper also improves the assembly by reducing the required mass which might otherwise be needed if the carrier housing had to support the thrust loads on smaller diameter shafts. The large diameter of the pinion supports distributes the forces over a greater area thereby reducing the amount of material needed in the bearing surfaces of the telescoping housing 46 and carrier 32, and their respective openings 50 and 48.

As can best be seen in FIG. 3, the assembly of the differential gear mechanism or bevel gear differential mechanism is really quite simple. The carrier 32 has installed therein the side gears 72 and 74, after which the telescoping housing 46 can be installed. With the housing 46 installed, the shaft 56 can be installed through respective openings 48 and 50, after which the shaft 54 can be installed to the respective openings 48 and 50 and through the bore 64 in the shaft 56.

Following this, the pinion gears can be inserted on their respective shafts. This is followed by assembly of the pinion supports 52 in their respective opening combinations 48 and 50. The keepers and locking rings 90 are then installed and the assembly is complete.

The output shafts 68 and 70 each have a groove 98 in which is disposed a locking ring 100. The groove 98 is sufficiently deep in a radial direction, such that the locking ring 100 can be compressed into the groove as the respective shafts 68 and 70 are inserted in the side gears. Once the shaft protrudes sufficiently into the side gear 72 or 74, the locking ring 100 has a spring quality which permits it to expand radially into notches 102 formed on each of the side gears 72 and 74.

Thus, the differential mechanism consisting of the bevel gears can be assembled quite simply without the use of extraordinary tools.

The embodiments of the invention in which an exclusive property or privilege is claimed are defined as follows:

1. A differential gear assembly comprising:

housing means directing input torque to said assembly comprising first and second telescoping portions, and radially aligned openings in said telescoping portions;

first pinion support means slidably disposed in a diametrically opposed pair of said radially aligned openings for preventing telescoping of said telescoping portions and rotatably supporting first and second radially spaced pinion gear means;

second pinion support means slidably disposed in a diametrically opposed pair of said radially aligned openings for preventing telescoping of said telescoping portions and rotatably supporting third and fourth radially spaced pinion gear means;

output gear means simultaneously meshing with said first, second, third and fourth pinion gear means for receiving power therefrom; and output shaft means drivingly connected with said output gear means for delivering torque from said assembly;

said first pinion support means being operable to balance gear tooth loads generated in response to torque loads between the first and second radially spaced pinion gear means and said output gear means, and said second pinion support means being operable to balance gear tooth loads generated in response to torque loads between said third and fourth radially spaced pinion gear means and said output gear means independently of said first pinion support means.

2. A differential gear assembly comprising:

housing means directing input torque to said assembly comprising first and second telescoping portions, and radially aligned openings in said telescoping portions;

first pinion support means installed for movement on a longitudinal axis in a diametrically opposed pair of said radially aligned openings for preventing telescoping of said telescoping portions and for rotatably supporting first and second radially spaced pinion gear means;

second pinion support means installed for movement on a longitudinal axis in a diametrically opposed pair of said radially aligned openings for preventing telescoping of said telescoping portions and for rotatably supporting third and fourth radially spaced pinion gear means;

output gear means simultaneously meshing with said first, second, third and fourth pinion gear means for receiving power therefrom; and output shaft means drivingly connected with said output gear means for delivering torque from said assembly;

said first and second pinion support means being movable on the respective longitudinal axes to balance gear tooth loads on the respective pinion gear means generated in response to torque loads between said first and second radially spaced pinion gear means, said third and fourth radially spaced pinion gear means and said output gear means.

* * * * *